Patented June 24, 1952

2,601,274

UNITED STATES PATENT OFFICE 2,601,274

MUCIC ACID RETARDED PORTLAND CEMENT

Omar J. Glantz and Eugene T. Oborn, Denver, Colo., assignors to the United States of America as represented by the Secretary of the Interior No Drawing. Application August 26, 1949, Serial No. 112,641

1 Claim. (Cl. 106—90)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to structural materials prepared from Portland cement. Particularly the invention relates to the regulation of the time of set for pastes, mortars, concretes, and like materials containing Portland cement.

When pure Portland cement is mixed with water the various cement constituents hydrate and hydrolyze and the mixture will set or harden into a solid mass. These reactions occur with great rapidity and frequently evolve considerable quantities of heat. This characteristic of Portland cement-water mixture is termed "flash set." This feature is considered objectionable to users of cement because the reactions and setting occur with such rapidity that the mixture will not remain sufficiently pliable to insure its proper distribution in the casting and moulding forms. Heretofore it was found that if the cement clinkers were ground with a small quantity of gypsum the time of set of the cement-water mixtures could be retarded. While the addition of gypsum was found to overcome "flash setting," the use of gypsum treated cements is objectionable because mixtures of water and gypsum treated cement are thixotropic; i. e., "set" occurs without the liberation of heat and is apparently due to agglomeration of the particles rather than the hydration and hydrolysis of the cement constituents. In such a "set" the particles cluster or knit together to form a relatively rigid mass of low mechanical strength which can be broken up by shaking or stirring. Hereinafter this characteristic of gypsum treated cements will be referred to as premature stiffening; however, it is often known by the terms phony set, grab set, false set, gum set, and other similar names. Flash set is especially noticeable when the tricalcium aluminate content of the cement is greater than about 8 percent. High alkali cements too exhibit flash set characteristics.

Accordingly, it is an object of this invention to provide a method to retard both the true setting time of cement-water mixtures and to prevent premature stiffening of the cement-water mixture.

It is another object of this invention to provide a dry cement composition which, when mixed with water, will set slowly and will not exhibit premature stiffening.

Other objects and advantages will be apparent or will appear hereinafter.

These objects and advantages are accomplished in accordance with this invention by carrying out the hydration and hydrolysis of Portland cement in the presence of mucic acid and its derivatives.

Portland cements which can be treated in accordance with this invention include all Portland cements, and especially Portland cements which have one or more of the following characteristics: a calcium aluminate content greater than about 8 percent; a high alkali content (greater than about 0.60 percent $Na_2O$); an ignition loss greater than about 1 percent (cement prepared from wet clinker); or elements containing 0.5 percent or more uncombined lime.

In operation the mucic acid can be mixed with the cement in various ways. For example, it can be ground together with the cement clinker; the dry ground cement can be blended with the mucic acid; or the acid can also be suspended or dissolved in the water used to prepare the cement containing material. The invention however is not to be construed as limited to such methods of incorporating the cement and acid.

By this invention it has been found that when from about .01 to .5 percent mucic acid is mixed with cement, the time of setting of pastes, mortars, concretes, and the like, prepared therefrom will be retarded from 1 minute to final set of the cement without exhibiting premature stiffening characteristics.

While the invention as previously described contemplates the substitution of mucic acid or its derivatives for gypsum as a retarder for Portland cement, it is not limited thereto; and these compounds can be effectively employed together with other cement additives including gypsum.

What is claimed is:

In a process involving the hydration of Portland cement to harden and set the same, the improvement which comprises incorporating therewith about 0.01 to 0.5 percent by weight of mucic acid to inhibit flash setting.

OMAR J. GLANTZ.
EUGENE T. OBORN.

REFERENCES CITED

The following references are of record in the file of this patent:

UNITED STATES PATENTS

| Number | Name | Date |
|---|---|---|
| 2,174,051 | Winkler | Sept. 26, 1939 |
| 2,478,831 | MacPherson | Aug. 9, 1949 |